United States Patent [19]

Altermatt

[11] Patent Number: 5,723,586
[45] Date of Patent: *Mar. 3, 1998

[54] DISPERSE DYES

[75] Inventor: Ruedi Altermatt, Buckten, Switzerland

[73] Assignee: Clariant Finance (BVI) Limited, Tortola, Virgin Islands (Br.)

[*] Notice: The term of this patent shall not extend beyond the expiration date of Pat. No. 5,633,355.

[21] Appl. No.: 663,882

[22] Filed: Jun. 14, 1996

[30] Foreign Application Priority Data

Jun. 19, 1995 [DE] Germany .......... 195 22 130.3

[51] Int. Cl.⁶ .......... C09B 29/08; D06P 1/18; D06P 3/52
[52] U.S. Cl. .......... 534/761; 534/765; 534/768; 534/769; 534/770; 534/777; 534/804; 8/471; 8/506; 8/529; 8/532; 8/639; 8/693; 8/922
[58] Field of Search .......... 534/761, 765, 534/768, 769, 770, 777, 804; 8/471, 506, 529, 532, 693

[56] References Cited

U.S. PATENT DOCUMENTS

| | | | |
|---|---|---|---|
| 3,970,617 | 7/1976 | Bruno .......... | 534/804 |
| 4,210,586 | 7/1980 | Clark et al. .......... | 534/804 X |
| 4,271,071 | 6/1981 | Clark .......... | 534/777 X |
| 4,439,362 | 3/1984 | Koerte .......... | 534/777 X |
| 5,420,254 | 5/1995 | Altermatt et al. .......... | 534/761 X |

FOREIGN PATENT DOCUMENTS 2712969 10/1978 Germany .......... 534/804

*Primary Examiner*—Fiona T. Powers
*Attorney, Agent, or Firm*—Gabriel Lopez, Esquire

[57] ABSTRACT

Disperse dyes of the general formula I

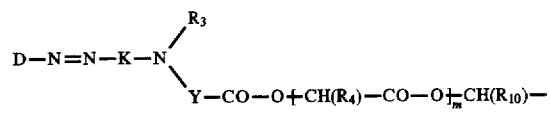

-continued

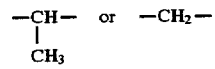

wherein

D signifies a diazo component which is usual with disperse dyes,

K signifies an aromatic radical of formula

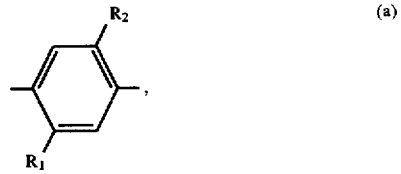

(a)

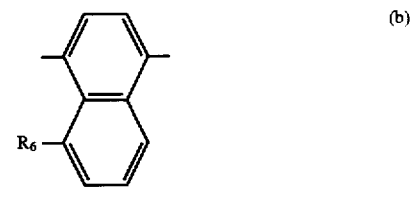

(b)

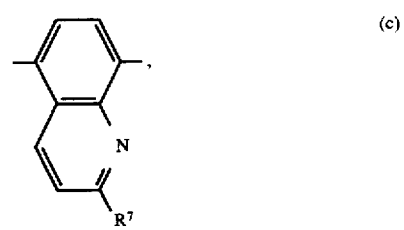

(c)

Y signifies $$-\underset{\underset{CH_3}{|}}{CH}- \quad \text{or} \quad -CH_2-$$

and the other symbols have the meanings as defined in claim 1, are useful for dyeing or printing hydrophobic, fully or half-synthetic organic fiber materials.

12 Claims, No Drawings

DISPERSE DYES

The invention relates to the disperse dyes of the general formula I

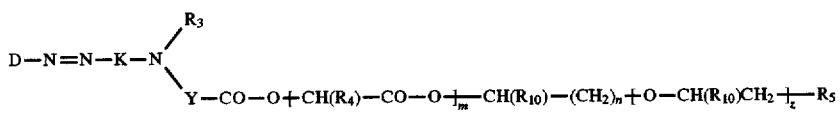

wherein

D signifies a diazo component which is usual with disperse dyes.

K signifies an aromatic radical of formula

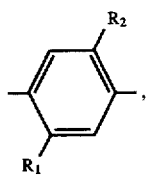 (a)

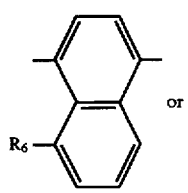 (b)

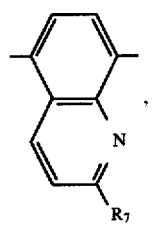 (c)

$R_5$ signifies a radical of formula

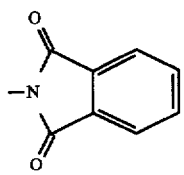 or 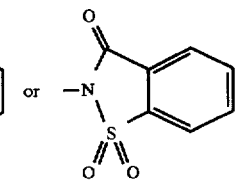

$R_6$ signifies hydrogen or hydroxyl.

$R_7$ signifies hydrogen or $C_{1-4}$-alkyl.

$R_8$ signifies hydroxyl, $C_{1-4}$-alkylcarbonyloxy or $C_{1-4}$-alkoxycabonyloxy, $R_9$ signifies chlorine, $C_{1-4}$-alkoxy, phenoxy, allyloxy, $C_{1-4}$-alkylcarbonyloxy, hydrogen or $C_{1-4}$-alkyl.

$R_{10}$ signifies hydrogen or $C_{1-4}$-alkyl.

Y signifies

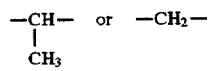

m and z independently signify zero or 1 and n signifies a number from 1 to 5, with the proviso that, if K is a radical of formula b or c, $R_3$ signifies hydrogen, and mixtures thereof.

One group of preferred dyestuffs of formula I corresponds to the general formula Ia

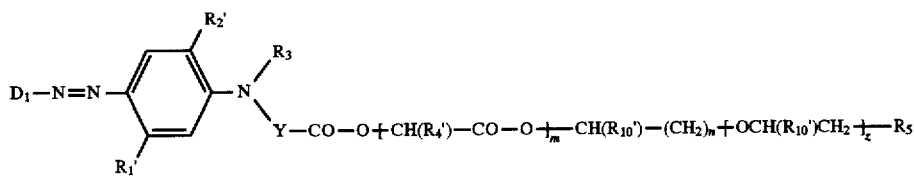

$R_1$ signifies hydrogen, chlorine, $C_{1-2}$-alkoxy, acylamino.

$R_2$ signifies hydrogen, $C_{1-4}$-alkoxyethoxy, chlorine, bromine, or together with $R_3$ signifies a group of formula —*CH(CH$_3$)CH$_2$C(CH$_3$)$_2$—(*bonded to the nucleus).

$R_3$ signifies hydrogen, $C_{1-6}$-alkyl, $C_{3-4}$-alkenyl, chloro— or bromo-$C_{3-4}$-alkenyl, $C_{3-4}$-alkinyl, phenyl-$C_{1-3}$-alkyl, $C_{1-4}$-alkoxycarbonyl-$C_{1-3}$-alkyl, allyl, $C_{1-2}$-alkoxyethyl, $C_{3-4}$-alkenyloxycarbonyl-$C_{1-3}$-alkyl, $C_{3-4}$alkinyloxycarbonyl-$C_{1-3}$-alkyl, phenoxy-$C_{2-4}$-alkyl; $C_{2-4}$-alkyl substituted by halogen, cyano, $C_{1-4}$alkoxy, $C_{1-4}$-alkylcarbonyloxy or $C_{1-4}$-alkoxycarbonyloxy; or a group of formula —CH$_2$—CH(R$_8$)CH$_2$—R$_9$.

$R_4$ signifies hydrogen, phenyl or $C_{1-2}$-alkyl.

wherein $D_1$ is 3-phenyl-1,2,4-thiadiazolyl or corresponds to one of the following formulae:

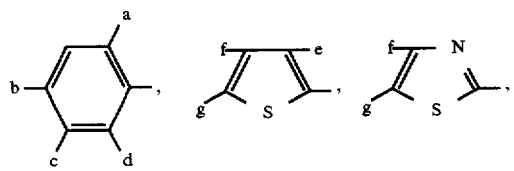

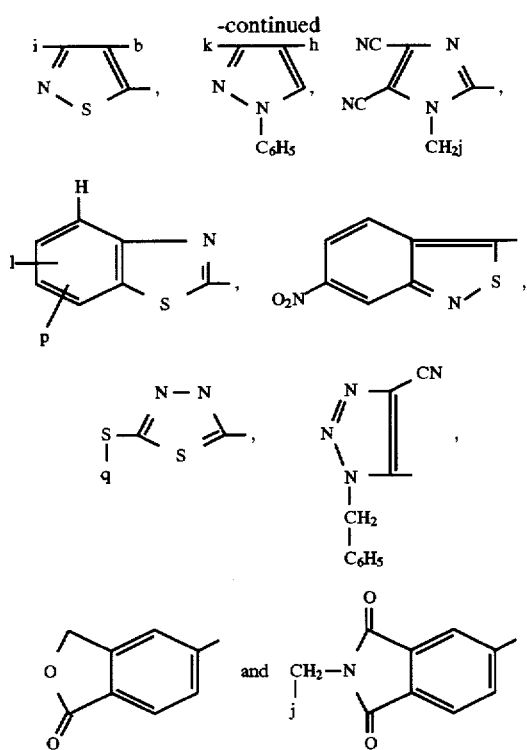

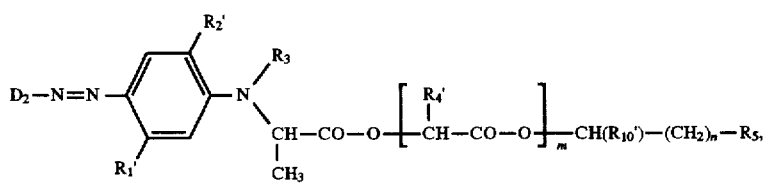

wherein

- a signifies hydrogen, chlorine, bromine, cyano, nitro-, $C_{1-4}$-alkoxycarbonyl, $C_{1-3}$-alkylsulphonyl, preferably hydrogen, chlorine, cyano or nitro,
- b signifies chlorine, bromine, nitro, methyl, $C_{1-2}$-alkylsulphonyl, $C_{1-4}$-alkylcarbonyl, aminosulphonyl, mono- or di-$C_{1-4}$-alkylaminosulphonyl, phenylaminosulphonyl, $C_{1-4}$-alkoxycarbonyl, aminocarbonyl, mono- or di-$C_{1-4}$-alkylaminpcarbonyl, phenylaminocarbonyl, phenylazo, benzyloxycarbonyl, tetrahydrofurfuryl-2-oxycarbonyl, $C_{3-4}$-alkenyloxycarbonyl, $C_{3-4}$-alkinyloxycarbonyl or phenoxycarbonyl, preferably nitro,
- c signifies hydrogen or chlorine, or if d is hydrogen, also thiocyano,
- d signifies hydrogen, chlorine, bromine or cyano,
- e signifies nitro, $C_{1-4}$-alkylcarbonyl, $C_{1-4}$-alkoxycarbonyl, cyano, aminocarbonyl, mono- or di-$C_{1-4}$-alkylaminocarbonyl,
- f signifies hydrogen, chlorine, bromine, $C_{1-2}$-alkyl or phenyl,
- g signifies nitro, cyano, formyl, dicyanovinyl or a group of formula —CH=CH—NO$_2$, —CH=C(CN)CO—OC$_{1-4}$-alkyl, H$_5$C$_6$—N=N— or 3- or 4NO$_2$—C$_6$H$_4$—N=N—,
- h signifies cyano or $C_{1-4}$-alkoxycarbonyl,
- i signifies $C_{1-4}$-alkyl, phenyl or $C_{1-4}$-alkylmercapto,
- j signifies —CN, —CH=CH$_2$ or phenyl,
- k signifies $C_{1-4}$-alkyl,
- l signifies hydrogen, chlorine, bromine, cyano, thiocyano, nitro, $C_{1-4}$-alkoxycarbonyl, di-$C_{1-4}$-alkylaminosulphonyl or formyl,
- p signifies hydrogen, chlorine or bromine and
- q signifies $C_{1-4}$-alkyl, $C_{1-4}$-alkoxycarbonyl-$C_{1-4}$-alkylene or $C_{1-4}$-alkylene-COOCH$_2$CF$_3$, whereby the phenyl nuclei of these substituents may bear one or two substituents from the series chlorine, bromine, methyl or $C_{1-2}$-alkoxy, $R_1'$ signifies hydrogen, $C_{1-2}$-alkyl, chlorine or acylamino, $R_2'$ signifies hydrogen, chlorine, $C_{1-2}$-alkoxy, $C_{1-2}$-alkoxyethoxy, or with $R_3$, a group of formula —CH(CH$_3$)CH$_2$C(CH$_3$)$_2$—, $R_3$ and $R_5$ have the meanings given above, $R_4'$ and $R_{10}'$ independently signify hydrogen or $C_{1-2}$-alky and Y, m, z and n have the above meanings.

Particularly preferred disperse dyes correspond to formula Ib wherein

D$_2$ signifies the radical of a diazo component from the series 2,6-dicyano-4-chloro-, -4-bromo-, -4-methyl- or -4-nitrophenyl, 2,4-dinitro-6-chloro-, -6-bromo- or -6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro-, 2-bromo- or 2-cyano-4-nitrophenyl, 2,4-dinitro-5-chlorophenyl or -5-thiocyanophenyl, 2,4-dinitro-5,6-dichlorophenyl, 2,5-dichloro-4-nitrophenyl, 4-nitrophenyl, 4-phenylazophenyl, 4-$C_{3-4}$-alkenyloxycarbonylphenyl, 4-$C_{3-4}$-alkinyloxycarbonylphenyl, 4-$C_{1-4}$-alkoxycarbonylphenyl, 2-$C_{1-4}$-alkoxycarbonyl-4-nitrophenyl, 4-phenoxycarbonylphenyl, 4-benzyloxycarbonylphenyl, 4-(tetrahydrofurfuryl-2'-oxycarbonyl)-phenyl, 3,5-dicyano-4-chloro-thienyl-2, 3,5-dicyano-thienyl-2,3-cyano-5-nitro-thienyl-2,3-acetyl-5-nitro-thienyl-2,3,5-dinitro-thienyl-2,3-($C_{1-4}$-alkoxycarbonyl)-5-nitro-thienyl-2,5-phenylazo-3-cyanothienyl-2,5-phenylazo-3-cyano-4-methyl-thienyl-2,5-nitro-thiazolyl-2,5-nitrobenzisothiazolyl-3, 3-methyl-4-cyano-isothiazolyl-5,3-phenyl-1,2,4-thiadiazolyl-2,5-($C_{1-2}$-alkylmercapto)-1,3,4-thiadiazolyl-2,3-$C_{1-2}$-alkoxycarbonylethylmercapto-1, 2,4-thiadiazolyl-5,1-cyanomethyl-4,5-dicyano-imidazolyl-2,6-nitrobenzothiazolyl-2,5-nitrobenzothiazolyl-2, 6-thiocyanobenzothiazolyl-2,6- chlorobenzothiazolyl-2,(5),6, (7)-dichlorobenzothiazolyl-2, phthalidyl-5 or of formula

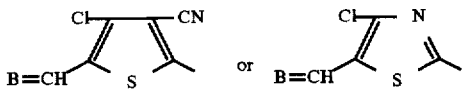

in which B signifies oxygen or a group of formula

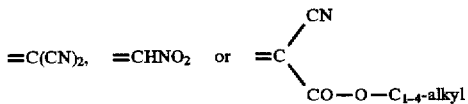

and the symbols $R_1'$, $R_2'$, $R_3$, $R_4'$, $R_5$, $R_{10}'$, m and n are defined as above.

Furthermore, particular preference is given to the disperse dyes of formula Ib, wherein $D_2$ signifies the radical of a diazo compound of formula 2,6-dicyano-4-chloro, -4-bromo, -4-methyl or -4-nitrophenyl, 2,4-dinitro-6-chloro-, -6-bromo- or -6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro-, 2-bromo- or 2-cyano-4-nitrophenyl, 2,4-dinitro-5-chlorophenyl or -5-thiocyanophenyl, 2,4-dinitro-5,6-dichlorophenyl, 2,5-dichloro-4-nitrophenyl, 4-nitrophenyl or phthalidyl-5, $R_1'$ signifies hydrogen, methyl or acylamino, $R_2'$ signifies hydrogen, $C_{1-2}$-alkoxy or $C_{1-2}$-alkoxyethoxy, $R_3$ signifies hydrogen, $C_{1-4}$-alkyl, allyl, $C_{1-2}$-alkoxyethyl, $C_{1-2}$-alkoxycarbonyloxyethyl or $C_{1-2}$-alkylcarbonyloxyethyl, $R_4'$ signifies hydrogen, $R_5$ signifies a radical as above defined, $R_{10}'$ signifies hydrogen m signifies 0 or 1 and n signifies 1 or 2.

Other suitable dyes of formula Ib, are those wherein $D_2$ signifies a diazo component from the series 2,4-dinitro-6-chloro-, -6-bromo- or -6-cyanophenyl, 2,4-dinitro-5-chloro- or -5-thiocyanophenyl or 2,4-dinitro-5,6-dichlorophenyl, $R_1'$ signifies $C_{1-2}$-alkylcarbonylamino, $R_2'$ signifies $C_{1-2}$-alkoxy or $C_{1-2}$-alkoxyethoxy, $R_3$ signifies hydrogen, $C_{1-4}$-alkyl, cyanoethyl, $C_{1-2}$-alkoxyethyl, $C_{3-4}$-alkenyl, $C_{1-2}$-alkylcarbonyloxyethyl, chlorallyl, $C_{3-4}$-alkinyl, $C_{1-2}$-alkoxycarbonylmethyl, allyloxycarbonylmethyl or propargyloxycarbonylmethyl, $R_4'$ signifies hydrogen or methyl and $R_5$, $R_{10}'$, m and n have the meanings given above.

Further suitable dyes of formula Ib, are those wherein $D_2$ signifies a diazo component from the series 4-nitrophenyl, 2-chloro-4-nitrophenyl, 2-bromo-4-nitrophenyl, 2,6-dichloro-4-nitrophenyl, 2-chloro-4-nitro-6-bromophenyl or 2-cyano-4-nitrophenyl, $R_1'$ signifies hydrogen or methyl.

$R_2'$ signifies hydrogen, $R_3'$ signifies $C_{1-4}$-alkyl $R_4'$ signifies hydrogen or methyl, $R_5$ signifies a radical as above defined, $R_{10}'$ signifies hydrogen m signifies zero or 1, and n signifies 1.

Still further suitable dyes of the present invention are those corresponding to formula Ic,

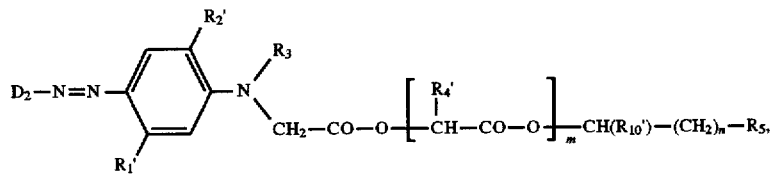

(Ic)

wherein $D_2$ signifies the radical of a diazo compound of formula 2,6-dicyano-4-chloro, -4-bromo, -4-methyl or -4-nitrophenyl, 2,4-dinitro-6-chloro-, -6-bromo- or -6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro-, 2-bromo- or 2-cyano-4-nitrophenyl, 2,4-dinitro-5-chlorophenyl or -5-thiocyanophenyl, 2,4-dinitro-5,6-dichlorophenyl, 2,5-dichloro-4-nitrophenyl, 4-nitrophenyl or phthalidyl-5 and the symbols $R_1'$, $R_2'$, $R_3$, $R_4'$, $R_5$, $R_{10}'$, m and n are defined as above.

The diazo components may be all mono- to bi-nuclear, carbocyclic or heterocyclic organic radicals of aromatic character, which may bear substituents that are conventional in the case of disperse dyes. Water-solubilizing substituents are excluded in particular, that is especially sulphonic acid groups. The diazo components may also be radicals of monoazo compounds. Examples of diazo components are: phenyl, thienyl, thiazolyl, isothiazolyl, thiadiazolyl, pyrazolyl, imidazolyl, triazolyl, benzothiazolyl or benzisothiazolyl radicals, which preferably bear substituents as indicated from the above meanings of $D_1$.

The substituents on these nuclei may be in particular halogen atoms, especially chlorine or bromine atoms, nitro, cyano, thiocyano, hydroxyl, alkyl, alkoxy, phenyl, phenoxy and acyl groups, as well as especially also on the thienyl or thiazolyl diazo components, formyl and radicals of formulae —CH=CH—NO$_2$, —CH=C(CN)$_2$ and —CH=C(CN) acyl.

Preferred acyl groups correspond to formula E–Z in which

E signifies hydrogen or a hydrocarbon radical which may bear the abovementioned substituents and/or may contain hetero atoms, preferably an optionally substituted alkyl or phenyl radical and Z signifies a radical —O—CO—, —SO$_2$—, —O—SO$_2$—, —CO—, —NE—CO— or —NE—SO$_2$—.

If not otherwise stated, all the said alkyl and alkoxy groups contain 1 to 8, especially 1 to 4 carbon atoms. They may be straight-chain or branched, and bear as substituents e.g. halogen atoms, preferably fluorine or chlorine atoms, hydroxy, alkoxy, phenyl, phenoxy, cyano, thiocyano, acyl, acyloxy or acylamino groups.

All the said phenyl radicals (also phenoxy and phenylazo radicals) may be further substituted, e.g. by halogen atoms (preferably chlorine or bromine atoms), alkyl, alkoxy, nitro, cyano, thiocyano, acyl, acyloxy or acylamino groups.

If not indicated to the contrary, all alkyl, alkylene and alkenyl radicals are straight-chain.

Production of the new dyestuffs of formula I is characterized in that a diazotized amine of formula II $$D—NH_2 \quad (II)$$

is coupled with a compound of formula III

Diazotization and coupling are effected according to generally known methods.

The compounds of formulae II and III are known, or may be easily produced from known compounds according to methods known to a person skilled in the art.

Dyestuffs of formula I in which D corresponds to the formula

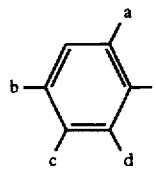

where a and/or d are a cyano radical, can also be prepared by cyano-exchange from the corresponding halogen substituted dyestuffs, such a method is known to the skilled person.

Dyestuffs of formula I in which m is 1 and D corresponds to the formula

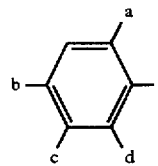

wherein the symbols a, b, c und d have the above meanings can also be made by reacting

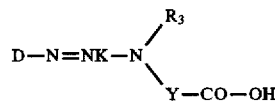

with a compound of the following formula

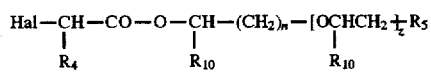

wherein Hal is preferably chlorine or bromine and the symbols $R_4$, $R_{10}$, $R_5$, n and z have the above defined meanings. Such a method is known to the skilled man.

From an aqueous suspension, the new dyestuffs of formula I are absorbed in an excellent manner on textile material consisting of fully synthetic or semi-synthetic, hydrophobic, high molecular weight organic material. They are especially suitable for dyeing or printing textile material consisting of linear, aromatic polyesters, as well as cellulose-2½-acetate and cellulose triacetate.

Dyeing or printing are effected in accordance with known processes, e.g. those described in French Patent Specification no. 1,445,371.

The dyeings obtained have good all-round fastnesses; in addition to the particularly good fastness to thermomigration, also notable are the light fastness, thermofixation fastness and pleating fastness, as well as the excellent wet fastness, following thermal fixation (especially the M&S C4A wash).

They are also suitable for thermo transfer printing processes.

In the following examples, the parts and percentages are by weight. The temperatures are given in degrees celsius.

EXAMPLE 1

16.3 parts of 2-amino-5-nitrobenzonitrile are stirred into 100 parts of cold sulfuric acid (93%) and mixed at 0° to 5° over the course of 30 minutes with 32 parts of nitrosylsulphuric acid (40%). Stirring continues for 3 to 4 hours at 0° to 5° and then the diazonium salt solution obtained is poured whilst stirring into a mixture of 35.2 parts of 2-(N-methyl-N-phenylamino)-propionic acid-2'-N-phthalimidoethylester, 100 parts of glacial acetic acid, 2 parts of amidosulphonic acid, 200 parts of water and 500 parts of ice. The precipitated dyestuff is filtered off, washed with water until free from acid and dried in a vacuum at 60°. The resultant dyestuff corresponds to formula

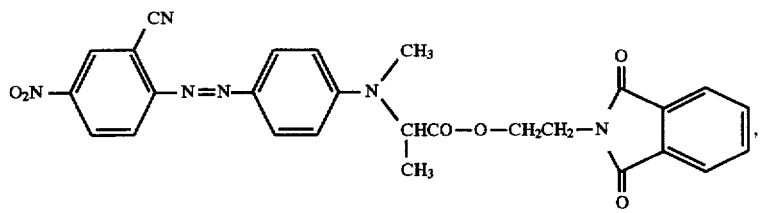

It dyes polyester fibre material in ruby-red shades with excellent fastness, in particular very good wet fastness after thermal fixing, and is eminently suitable for the modern rapid-dyeing processes, for example the ®Foron-RD process. $\lambda_{max}$=519 nm(DMF).

EXAMPLE 2

The process is as described in example 1, but the 35.2 parts of 2-(N-methyl-N-phenylamino)-propionic acid-(2'-N-phthalimido)ethylester are replaced by 41.0 parts of 2-(N-methyl-N-phenylamino)-propionic acid-(2'-N-phthalimidoethoxycarbonyl)methylester. The resultant dyestuff corresponds to formula

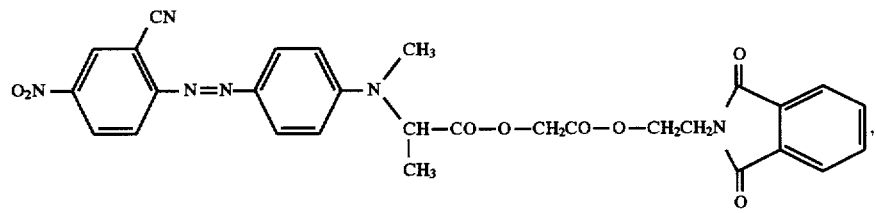

It dyes polyester fibre material in ruby-red shades with excellent fastness, in particular very good wet fastness after thermal fixing. $\lambda_{max}$=516 nm (DMF).

EXAMPLE 3

The process is as described in example 1, but the 35.2 parts of 2-(N-methyl-N-phenylamino)-propionic acid-2'-N-phthalimidoethylester are replaced by 38.8 parts of 2-(N-methyl-N-phenylamino)-propionic acid-2'-N-o-sulphobenzimidoethylester. The resultant dyestuff corresponds to formula

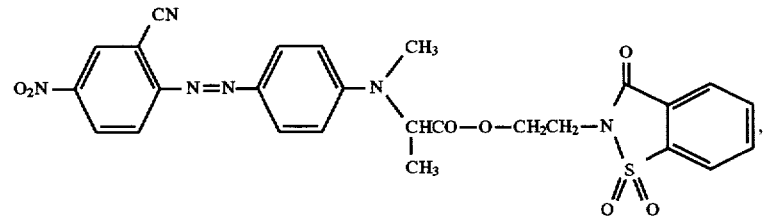

It dyes polyester fibre materials in ruby-red shades with excellent fastness, in particular very good wet fastness, after thermal fixing. $\lambda_{max}$=522 nm (DMF).

EXAMPLE 4

20.7 parts of 1-amino-2,6-dichloro-4-nitrobenzene are stirred into 100 parts of sulfuric acid (93%) and mixed at 30° over the course of one hour with 32 parts of nitrosylsulphuric acid (40%). Stirring is effected for 2-3 hours at 30°–32°, and then the diazonium salt solution obtained is added in drops whilst stirring to a mixture of 35.2 parts of 2-(N-methyl-N-phenylamino)-propionic acid-2'-N-phthalimidoethylester, 100 parts of glacial acetic acid, 2 parts of amidosulphonic acid, 200 parts of water and 500 parts of ice. The precipitated dyestuff is filtered off, washed with water until free from acid, and dried in a vacuum at 60°. It corresponds to formula

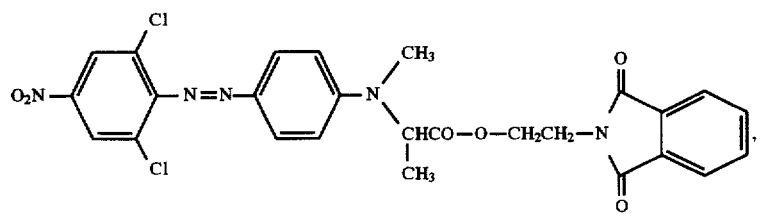

and dyes polyester fibre material in yellow-brown shades with excellent fastness, inparticular very good wet fastness, after thermal fixing. $\lambda_{max}$(DMF)=431 nm.

The dyes of the following table 1 are made according to Example 1 using the corresponding starting materials and have the following formula:

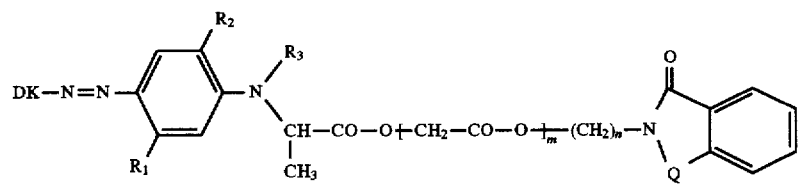

TABLE 1

| Ex. No. | DK | $R_1$ | $R_2$ | $R_3$ | m | n | Q | Shade on PES | $\lambda$max (DMF) nm |
|---|---|---|---|---|---|---|---|---|---|
| 5 | O₂N—⌬—CN | H | H | —CH₃ | 0 | 3 | \C=O/ | ruby | 521 |
| 6 | " | —CH₃ | H | H | 0 | 2 | \S(=O)₂/ | " | 523 |
| 7 | " | —NHCOCH₃ | H | H | 0 | 2 | " | " | 538 |
| 8 | " | " | H | H | 0 | 2 | \C=O/ | " | 537 |
| 9 | " | H | H | —CH₃ | 1 | 3 | " | " | 517 |
| 10 | " | H | Cl | H | 0 | 2 | " | scarlet | 481 |
| 11 | O₂N—⌬— | H | H | —CH₃ | 0 | 2 | \C=O/ | orange | 474 |
| 12 | " | H | H | " | 0 | 2 | \S(=O)₂/ | " | 474 |
| 13 | " | H | H | " | 1 | 2 | " | " | 469 |
| 14 | " | H | H | " | 1 | 2 | \C=O/ | orange | 469 |

TABLE 1-continued
| Ex. No. | DK | R₁ | R₂ | R₃ | m | n | Q | Shade on PES | λmax (DMF) nm |
|---|---|---|---|---|---|---|---|---|---|
| 15 | " | H | H | " | 1 | 3 | " | " | 470 |
| 16 | " | H | H | —C₂H₅ | 1 | 2 | " | " | 474 |
| 17 | " | H | H | " | 1 | 3 | " | " | 474 |
| 18 | " | H | H | " | 1 | 2 |  | " | 475 |
| 19 | 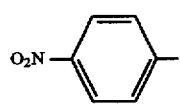 | H | Cl | —CH₃ | 0 | 2 |  | gold-yellow | 438 |
| 20 | 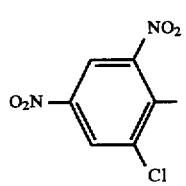 | —NHCOCH₃ | —OCH₃ | H | 0 | 2 | " | marine blue | 585 |
| 21 | " | " | " | H | 0 | 2 |  | " | 583 |
| 22 | " | " | " | H | 1 | 2 | " | " | 581 |
| 23 | " | " | " | H | 1 | 2 |  | " | 583 |
| 24 | 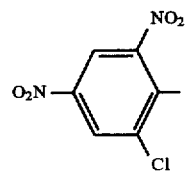 | —NHCOCH₃ | —OCH₃ | H | 1 | 3 |  | marine blue | 584 |
| 25 | " | " | —OC₂H₅ | H | 1 | 2 |  | " | 582 |
| 26 | 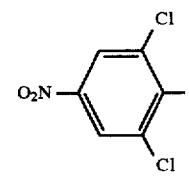 | H | H | —CH₃ | 0 | 2 | " | yellow-brown | 431 |
| 27 | " | H | H | —C₂H₅ | 0 | 2 | " | " | 434 |
| 28 | 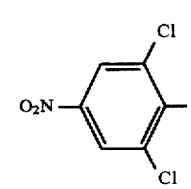 | H | H | —CH₃ | 1 | 2 |  | yellow-brown | 429 |
| 29 | " | H | H | " | 1 | 2 |  | " | 429 |

TABLE 1-continued

| Ex. No. | DK | $R_1$ | $R_2$ | $R_3$ | m | n | Q | Shade on PES | λmax (DMF) nm |
|---|---|---|---|---|---|---|---|---|---|
| 30 | " | H | H | " | 1 | 3 | " | " | 430 |
| 31 | [Cl,Cl-substituted benzothiazole] | H | H | " | 0 | 2 | " | red | 519 |
| 32 | " | H | H | " | 0 | 3 | " | " | 520 |
| 33 | [Cl,Cl-substituted benzothiazole] | H | H | —CH₃ | 0 | 2 | \\S(=O)₂/ | red | 519 |
| 34 | [Cl-substituted thiazole with CHO] | H | H | " | 0 | 2 | " | violet | 562 |
| 35 | " | H | H | " | 0 | 2 | \\C=O/ | " | 562 |
| 36 | [3-Cl-4-methyl-nitrobenzene] | —NHCOCH₃ | Cl | H | 1 | 2 | \\C=O/ | scarlet | 494 |
| 37 | " | " | Cl | H | 1 | 2 | \\S(=O)₂/ | " | 494 |
| 38 | " | " | Cl | H | 1 | 3 | \\C=O/ | " | 495 |
| 39 | " | H | H | —CH₃ | 1 | 2 | " | " | 496 |
| 40 | " | H | H | " | 1 | 2 | " | " | 496 |
| 41 | [phthalide] | H | H | " | 0 | 2 | " | gold-yellow | 442 |
| 42 | [phthalide] | H | H | —C₂H₅ | 0 | 2 | \\C=O/ | gold-yellow | 448 |
| 43 | " | —CH₃ | H | —CH₃ | 0 | 2 | " | " | 448 |
| 44 | " | " | H | " | 0 | 2 | \\S(=O)₂/ | " | 448 |

TABLE 1-continued
| Ex. No. | DK | R₁ | R₂ | R₃ | m | n | Q | Shade on PES | λmax (DMF) nm |
|---|---|---|---|---|---|---|---|---|---|
| 45 | " | H | H | " | 0 | 2 | " | " | 448 |
| 46 | " | —CH₃ | H | " | 1 | 2 |  | " | 443 |
| 47 | 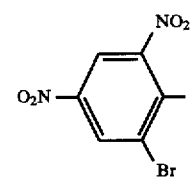 | —NHCOCH₃ | —OCH₃ | H | 0 | 2 | 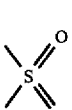 | marine-blue | 584 |
| 48 | 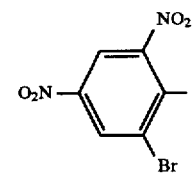 | —CH₃ | —OCH₃ | —CH₃ | 1 | 2 | 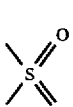 | violet | 560 |
| 49 | 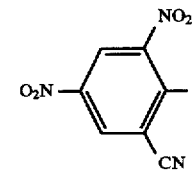 | " | " | " | 1 | 2 | " | blue | 600 |
| 50 | 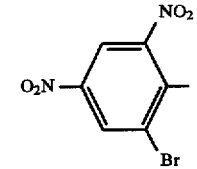 | —NHCOCH₃ | —OCH₃ | H | 1 | 2 | 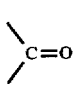 | marine-blue | 581 |
| 51 | 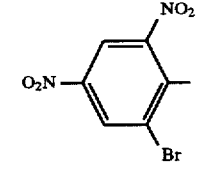 | —NHCOCH₃ | —OCH₃ | H | 1 | 3 | 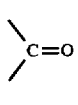 | marine-blue | 582 |
| 52 | " | " | " | H | 1 | 2 | 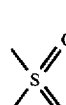 | " | 581 |
| 53 | 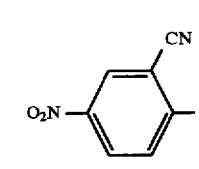 | H | H | —CH₂CH₂OCOCH₃ | 0 | 2 | 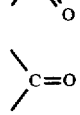 | red | 513 |
| 54 | " | H | H | —C₂H₅ | 1 | 2 | " | ruby | 520 |
| 55 | " | H | H | —CH₂CH=CH₂ | 0 | 2 | " | red | 515 |
| 56 | 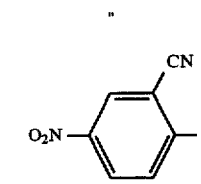 | H | H | —C₂H₅ | 0 | 2 | 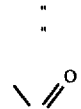 | ruby | 525 |

TABLE 1-continued

| Ex. No. | DK | R₁ | R₂ | R₃ | m | n | Q | Shade on PES | λmax (DMF) nm |
|---|---|---|---|---|---|---|---|---|---|
| 57 | 3,5-dichloro-nitrobenzene (Cl, O₂N, Cl) | H | H | " | 0 | 2 | \C=O/ | yellow-brown | 434 |
| 58 | " | H | H | " | 1 | 2 | " | " | 432 |
| 59 | chloro-cyano-thiophene carbaldehyde | —CH₃ | —OCH₃ | —CH₃ | 0 | 2 | " | blue | 603 |
| 60 | nitro-thiophene with N | —CH₃ | H | —C₄H₉ | 0 | 2 | \C=O/ | violet | 589 |
| 61 | H₃C, CN, H₅C₆—N=N, S thiophene | H | H | —C₂H₅ | 0 | 2 | " | marine-blue | 613 |
| 62 | O₂N-benzothiazole | H | H | " | 0 | 2 | " | red | 540 |
| 63 | SCN-benzothiazole | H | H | —CH₂CH₂CN | 0 | 2 | " | scarlet | 501 |
| 64 | O₂N-benzisothiazole | —CH₃ | H | —C₂H₅ | 0 | 2 | \S(=O)₂/ | marine-blue | 592 |
| 65 | H₃C-benzene-di-CN | " | H | " | 0 | 2 | " | scarlet | 500 |
| 66 | 2,4-dinitro-toluene | H | H | —CH₂CH₂O—CO—OCH₃ | 0 | 2 | " | red | 514 |
| 67 | 4-bromo-2-chloro-nitrobenzene | H | H | —CH₃ | 0 | 2 | \C=O/ | yellow-brown | 430 |

TABLE 1-continued

| Ex. No. | DK | $R_1$ | $R_2$ | $R_3$ | m | n | Q | Shade on PES | λmax (DMF) nm |
|---|---|---|---|---|---|---|---|---|---|
| 68 | 2-methyl-4-nitro-6-(SO₂CH₃)phenyl | H | H | —CH₃ | 0 | 2 | " | ruby | 512 |
| 69 | 2-methyl-4-nitro-6-(SO₂C₂H₅)phenyl | H | H | " | 0 | 3 | " | " | 514 |
| 70 | " | H | H | " | 1 | 2 | " | red | 509 |
| 71 | 5-chloro-2,4-dicyano-3-methylphenyl | —NHCOCH₃ | H | —C₂H₅ | 0 | 2 | >C=O | blueish red | 531 |
| 72 | 2-methyl-3-nitro-5-nitro-6-cyanophenyl | —CH₃ | —OCH₃ | —CH₃ | 1 | 3 | " | blue | 601 |
| 73 | " | " | " | " | 1 | 2 | >SO₂ | " | 602 |
| 74 | " | —NHCOCH₃ | " | H | 0 | 2 | >C=O | " | 611 |
| 75 | 2-methyl-3-nitro-5-nitro-6-cyanophenyl | —NHCOCH₃ | " | —CH₂—CH=CH—Cl | 0 | 2 | >SO₂ | blue | 621 |
| 76 | " | " | " | —CH₂CH=CH₂ | 0 | 2 | " | " | 625 |
| 77 | " | " | " | —C₃H₇-n | 1 | 2 | " | " | 608 |

TABLE 2

[Structure: DK—N=N—(benzene ring with R2 top, R1 bottom)—N(R3)—CH2—CO—O—[CH2—CO—O]m—(CH2)n—N(ring with C=O and Q, fused to benzene)]

| Ex. No. | DK | R₁ | R₂ | R₃ | m | n | Q | Shade on PES | λmax (DMF) nm |
|---|---|---|---|---|---|---|---|---|---|
| 78 | 2-CN, 4-O₂N-phenyl | H | H | —C₂H₅ | 0 | 2 | \C=O/ | ruby | 521 |
| 79 | " | —CH₃ | H | —CH₃ | 0 | 2 | " | " | 529 |
| 80 | " | H | H | —C₂H₅ | 0 | 2 | \S(=O)₂/ | " | 521 |
| 81 | 2-CN, 4-O₂N-phenyl | H | H | —C₂H₅ | 1 | 3 | \C=O/ | ruby | 518 |
| 82 | 2,6-Cl₂, 4-O₂N-phenyl | H | H | —CH₃ | 0 | 2 | " | yellow-brown | 429 |
| 83 | 4-O₂N-phenyl | H | H | " | 0 | 2 | \S(=O)₂/ | orange | 472 |
| 84 | " | H | H | —C₂H₅ | 1 | 2 | " | " | 473 |
| 85 | 2-CN, 4-O₂N-phenyl | H | Cl | H | 1 | 2 | \S(=O)₂/ | scarlet | 480 |
| 86 | " | H | Cl | H | 0 | 2 | \C=O/ | " | 483 |
| 87 | " | H | Cl | H | 1 | 2 | " | " | 480 |
| 88 | " | H | Cl | H | 1 | 2 | \S(=O)₂/ | " | 483 |
| 89 | 2-CN, 4-O₂N, 5-Br-phenyl | H | H | —CH₃ | 0 | 2 | \C=O/ | bordeaux red | 516 |

TABLE 3

| Ex. No. | Formula | Shade on PES | λmax (DMF) nm |
|---|---|---|---|
| 90 | 2,4-dinitro-6-chlorophenyl-N=N-(naphthalene-1,4-diyl)-NH-CH(CH₃)-CO-O-CH₂CH₂-N(phthalimide) | marine blue | 590 |
| 91 | 2,4-dinitro-6-chlorophenyl-N=N-(naphthalene-1,4-diyl)-NH-CH(CH₃)-CO-O-CH₂CH₂-N(saccharin) | " | 591 |
| 92 | 2-chloro-4-nitrophenyl-N=N-(5-hydroxynaphthalene-1,4-diyl)-NH-CH(CH₃)-CO-O-CH₂CH₂-N(phthalimide) | blue | 609 |
| 93 | 2-chloro-4-nitrophenyl-N=N-(5-hydroxynaphthalene-1,4-diyl)-NH-CH(CH₃)-CO-O-CH₂CH₂-N(saccharin) | " | 610 |
| 94 | 2,4-dinitro-6-chlorophenyl-N=N-(quinoline)-NH-CH(CH₃)-CO-O-CH₂CH₂-N(saccharin) | blueish violet | 570 |

TABLE 4

$$DK-N=N-\underset{R_1}{\underset{|}{\overset{R_2}{\overset{|}{\bigcirc}}}}-\underset{\underset{CH_3}{|}}{\overset{R_3}{\overset{|}{N}}}-\underset{CH_3}{\overset{|}{CH}}-CO-O+CH-CO-O\underset{m}{]}CHCH_2-\underset{Q}{N}\overset{O}{\underset{}{\overset{||}{\bigcirc}}}$$

| Ex. No. | DK | $R_1$ | $R_2$ | $R_3$ | $R_4$ | $R_{10}$ | m | Q | Shade on PES | λmax (DMF) nm |
|---|---|---|---|---|---|---|---|---|---|---|
| 95 | 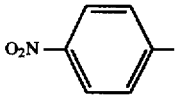 | H | H | −CH₃ | −CH₃ | H | 1 | \C=O/ | orange | 470 |
| 96 | " | H | H | " | — | CH₃ | 0 | " | " | 475 |
| 97 | 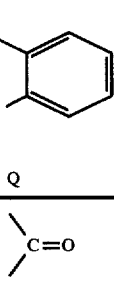 | H | H | " | CH₃ | H | 1 | \S(=O)₂/ | ruby | 520 |
| 98 | 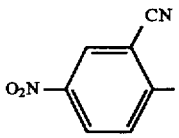 | H | H | −CH₃ | H | CH₃ | 1 | \C=O/ | ruby | 517 |
| 99 | 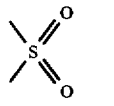 | −NHCOCH₃ | −OCH₃ | H | — | CH₃ | 0 | " | marine blue | 586 |
| 100 | 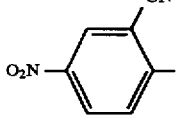 | CH₃ | −OCH₃ | −C₂H₅ | — | H | 0 | \C=O/ | blue | 666 |

APPLICATION EXAMPLE

The dyestuff obtained according to example 1 is converted by means of sand-grinding in the presence of dispersing agents, e.g. commercial lignin sulphonate, with subsequent fine disintegration, into an ultra-disperse dye preparation having an average particle size of 1 µm and a dilution ratio of 3:5:10.

12 parts of this preparation are made into a dispersion with 1000 parts of water, and added to the circulating liquor (13.000 parts, containing 30 parts of ammonium sulphate and 0.3 parts of formic acid as a buffer and optionally a carrier/levelling agent combination) at 60° C. The pre-cleaned, compressed, cross-wound spool (1000 parts of polyester yarn on a plastic sleeve) is introduced, the dyeing autoclave closed, and heated in 35 minutes to 130° C. After 90 minutes, cooling is effected to 80° C., the exhausted liquor is drained, and the substrate thus dyed is washed thoroughly with cold water, and purified by reduction in the usual manner. It is then centrifuged and dried. A level, pure, deep ruby-red dyeing is obtained.

Dyeing of polyester yarn can be carried out analogously with examples 2–100, whereby yielding a level, deep dyeing.

I claim:

1. A disperse dye of the general formula I

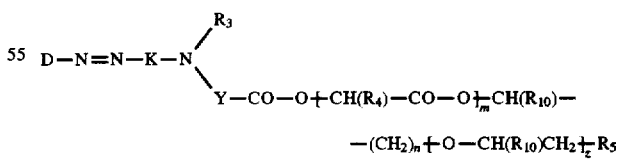

wherein

D signifies a diazo component which is usual with disperse dyes,

K signifies an aromatic radical of formula

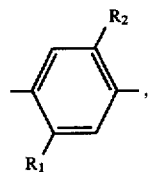 (a)

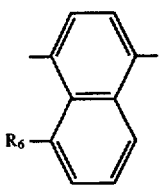 (b)

or

-continued

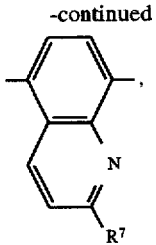 (c)

$R_1$ signifies hydrogen, chlorine, $C_{1-2}$-alkyl, $C_{1-2}$-alkoxy or acylamino, $R_2$ signifies hydrogen, $C_{1-4}$-alkoxy, $C_{1-2}$-alkoxyethoxy, chlorine, bromine, or together with $R_3$ signifies a group of formula —*CH(CH$_3$)CH$_2$C(CH$_3$)$_2$—(* bonded to the nucleus).

$R_3$ signifies hydrogen, $C_{1-6}$-alkyl, $C_{3-4}$-alkenyl, chloro- or bromo-$C_{3-4}$-alkenyl, $C_{3-4}$-alkinyl, phenyl-$C_{1-3}$-alkyl, $C_{1-4}$-alkoxycarbonyl-$C_{1-3}$-alkyl, allyl or $C_{1-2}$-alkoxyethyl,$C_{3-4}$-alkenyloxycarbonyl-$C_{1-3}$-alkyl, $C_{3-4}$-alkinyloxycarbonyl-$C_{1-3}$-alkyl, phenoxy-$C_{2-4}$-alkyl; $C_{2-4}$-alkyl substituted by halogen, cyano, $C_{1-4}$-alkoxy, $C_{1-4}$-alkylcarbonyloxy or $C_{1-4}$-alkoxycarbonyloxy or a group of formula —CH$_2$—CH(R$_8$)CH$_2$—R$_9$, $R_4$ signifies hydrogen, phenyl or $C_{1-2}$-alkyl, $R_5$ signifies a radical of formula

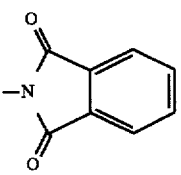 or 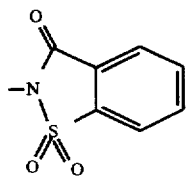

$R_6$ signifies hydrogen or hydroxyl,
$R_7$ signifies hydrogen or $C_{1-4}$-alkyl,
$R_8$ signifies hydroxyl, $C_{1-4}$-alkylcarbonyloxy or $C_{1-4}$-alkoxycarbonyloxy.
$R_9$ signifies chlorine, $C_{1-4}$-alkoxy, phenoxy, allyloxy, $C_{1-4}$-alkylcarbonyloxy, hydrogen or $C_{1-4}$-alkyl,
$R_{10}$ signifies hydrogen or $C_{1-4}$-alkyl,
Y signifies

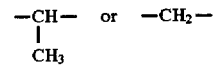

m and z independently signify zero or 1 and
n signifies a number from 1 to 5, with the proviso that, if K is a radical of formula b or c, $R_3$ signifies hydrogen, and mixtures thereof.

2. A disperse dye according to claim 1, having the general formula Ia

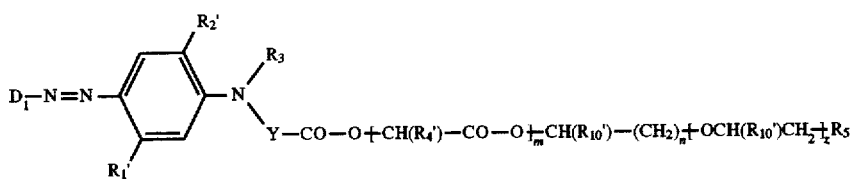 (Ia)

wherein $D_1$ is 3-phenyl-1,2,4-thiadiazolyl or corresponds to one of the following formulae:

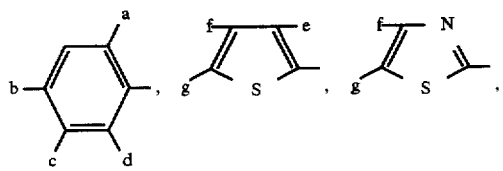

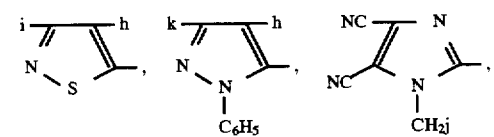

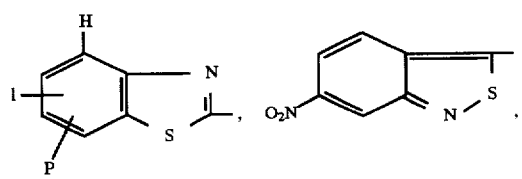

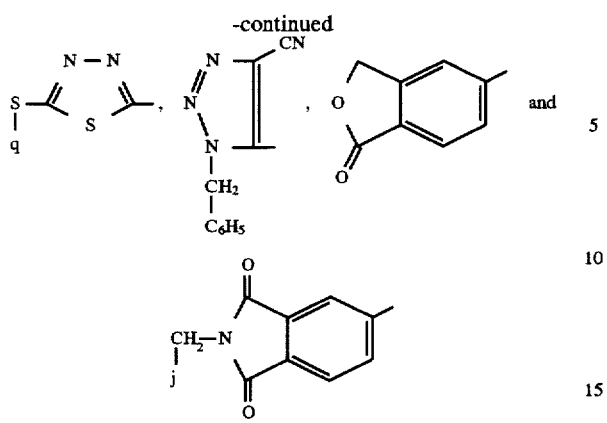

wherein

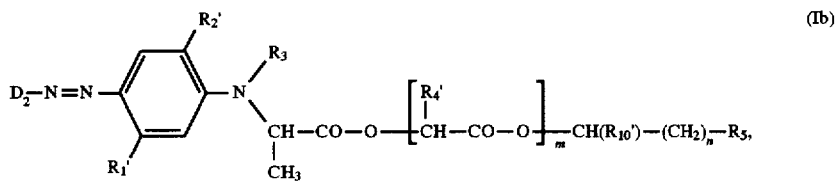

a signifies hydrogen, chlorine, bromine, cyano, nitro-, $C_{1-4}$-alkoxycarbonyl $C_{1-3}$-alkylsulphonyl, preferably hydrogen, chlorine, cyano or nitro, b signifies chlorine, bromine, nitro, methyl, $C_{1-2}$-alkylsulphonyl, $C_{1-4}$-alkylcarbonyl, aminosulphonyl, mono- or di-$C_{1-4}$-alkylaminosulphonyl, phenylaminosulphonyl, $C_{1-4}$-alkoxycarbonyl, aminocarbonyl, mono- or di-$C_{1-4}$-alkylaminocarbonyl, phenylaminocarbonyl, phenylazo, benzyloxycarbonyl, tetrahydrofurfuryl-2-oxycarbonyl, $C_{3-4}$-alkenyloxycarbonyl, $C_{3-4}$-alkinyloxycarbonyl or phenoxycarbonyl, preferably b is nitro, c signifies hydrogen or chlorine, or if d is hydrogen, also thiocyano, d signifies hydrogen, chlorine, bromine or cyano, e signifies nitro, $C_{1-4}$-alkylcarbonyl, $C_{1-4}$-alkoxycarbonyl, cyano, aminocarbonyl, mono- or di-$C_{1-4}$-alkylaminocarbonyl, f signifies hydrogen, chlorine, bromine, $C_{1-2}$-alkyl or phenyl, g signifies nitro, cyano, formyl, dicyanovinyl or a group of formula —CH=CH—NO$_2$, —CH=C(CN)CO—OC$_{1-4}$-alkyl, H$_5$C$_6$—N=N— or 3— or 4-NO$_2$—C$_6$H$_4$—N=N—, h signifies cyano or $C_{1-4}$-alkoxycarbonyl, i signifies $C_{1-4}$-alkyl, phenyl or $C_{1-4}$-alkylmercapto, j signifies —CN, —CH=CH$_2$ or phenyl, k signifies $C_{1-4}$-alkyl, l signifies hydrogen, chlorine, bromine, cyano, thiocyano, nitro, $C_{1-4}$-alkoxycarbonyl, di-$C_{1-4}$-alkylaminosulphonyl or formyl, p signifies hydrogen, chlorine or bromine and q signifies $C_{1-4}$-alkyl, $C_{1-4}$-alkoxycarbonyl-$C_{1-4}$-alkylene or $C_{1-4}$-alkylene-COOCH$_2$CF$_3$, whereby the phenyl nuclei of these substituents may bear one or two substituents from the series chlorine, bromine, methyl or $C_{1-2}$-alkoxy, $R_1'$ signifies hydrogen, $C_{1-2}$-alkyl, chlorine or acylamino, $R_2'$ signifies hydrogen, chlorine, $C_{1-2}$-alkoxy, $C_{1-2}$-alkoxyethoxy, or with $R_3$, a group of formula —CH(CH$_3$)CH$_2$C(CH$_3$)$_2$—, $R_4'$ and $R_{10}'$ independently signify hydrogen or $C_{1-2}$-alkyl and $R_3$, $R_5$, Y, m, z and n have the same meanings as in claim 1 above.

3. A disperse dye according to claim 1 having the formula Ib wherein

D$_2$ signifies the radical of a diazo component from the series 2,6-dicyano-4-chloro-, -4-bromo-, -4-methyl- or -4-nitrophenyl, 2,4-dinitro-6-chloro-, -6-bromo- or -6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro-, 2-bromo- or 2-cyano-4-nitrophenyl, 2,4-dinitro-5-chlorophenyl or -5-thiocyanophenyl, 2,4-dinitro-5,6-dichlorophenyl, 2,5-dichloro-4-nitrophenyl, 4-nitrophenyl, 4-phenylazophenyl, 4-$C_{3-4}$-alkenyloxycarbonylphenyl, 4-$C_{3-4}$-alkinyloxycarbonylphenyl, 4-$C_{1-4}$-alkoxycarbonylphenyl, 2-$C_{1-4}$-alkoxycarbonyl-4-nitrophenyl, 4-phenoxycarbonylphenyl, 4-benzyloxycarbonylphenyl, 4-(tetrahydrofurfuryl-2'-oxycarbonyl)-phenyl, 3,5-dicyano-4-chloro-thienyl-2, 3,5-dicyano-thienyl-2,3-cyano-5-nitro-thienyl-2,3-acetyl-5-nitro-thienyl-2,3,5-dinitro-thienyl-2,3-($C_{1-4}$-alkoxycarbonyl)-5-nitro-thienyl-2,5-phenylazo-3-cyanothienyl-2,5-phenylazo-3-cyano-4-methyl-thienyl-2,5-nitro-thiazolyl-2,5-nitrobenzisothiazolyl-3, 3-methyl-4-cyano-isothiazolyl-5,3-phenyl-1,2,4-thiadiazolyl-2,5-($C_{1-2}$-alkylmercapto)-1,3,4-thiadiazolyl-2,3-$C_{1-2}$-alkoxycarbonylethylmercapto-1, 2,4-thiadiazolyl-5,1-cyanomethyl-4,5-dicyano-imidazolyl-2,6-nitrobenzothiazolyl-2,5-nitrobenzothiazolyl-2,6-thiocyanobenzothiazolyl-2,6-chlorobenzothiazolyl-2,(5),6,(7)-dichlorobenzothiazolyl-2, phthalidyl-5 or of formula

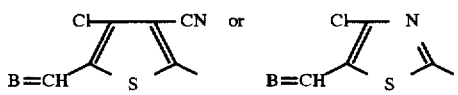

wherein B signifies oxygen or a group of formula

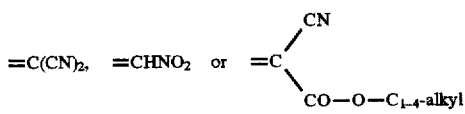

$R_1'$ signifies hydrogen, $C_{1-2}$-alkyl, chlorine or acylamino, $R_2'$ signifies hydrogen, chlorine, $C_{1-2}$-alkoxy, $C_{1-2}$-alkoxyethoxy, or with $R_3$, a group of formula

$R_4'$ and $R_{10}'$ independently signify hydrogen or $C_{1-2}$-alkyl $R_5$ signifies a radical of formula

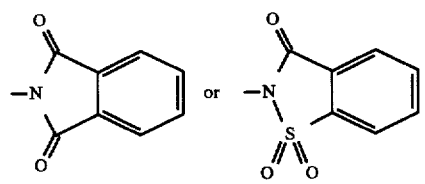

m signifies zero or 1, n signifies a number from 1 to 5.

4. A disperse dye having the formula Ib as claimed in claim 2, wherein $D_2$ signifies the radical of a diazo compound of formula 2,6-dicyano-4-chloro, -4-bromo, 4-methyl or -4-nitrophenyl, 2,4-dinitro-6-chloro-, -6-bromo- or -6-cyanophenyl, 2-chloro- or 2-bromo-4-nitro-6-cyanophenyl, 2,4-dinitrophenyl, 2,6-dichloro- or 2,6-dibromo-4-nitrophenyl, 2-chloro-4-nitro-6-bromophenyl, 2-chloro-, 2-bromo- or 2-cyano-4-nitrophenyl, 2,4-dinitro-5-chlorophenyl or -5-thiocyanophenyl, 2,4-dinitro-5,6-dichlorophenyl, 2,5-dichloro-4-nitrophenyl, 4-nitrophenyl or phthalidyl-5, $R_3$ signifies hydrogen, $C_{1-4}$-alkyl, allyl, $C_{1-2}$-alkoxyethyl, $C_{1-2}$-alkoxycarbonyloxyethyl or $C_{1-2}$-alkylcarbonyloxyethyl and the symbols $R_5$, m and n are defined as in claim 1 and $R_1'$, $R_2'$, $R_4'$ and $R_{10}'$ are as defined in claim 2.

5. A disperse dye having the formula Ib as claimed in claim 2, wherein $D_2$ signifies the radical of a diazo compound of formula 2,6-dicyano-4-chloro, -4-bromo, -4-methyl or -4-nitrophenyl, 2,4-dinitro-6-chloro-, -6-bromo- or -6-cyanophenyl, 2-chloro- or 2-bromo-4-nitro-6-cyanophenyl, 2,4-dinitrophenyl, 2,6-dihloro- or 2,6-dibromo-4-nitrophenyl, 2-chloro-4-nitro-6-bromophenyl, 2-chloro-, 2-bromo- or 2-cyano-4-nitrophenyl, 2,4-dinitro-5-chlorophenyl or -5-thiocyanophenyl, 2,4-dinitro-5,6-dichlorophenyl, 2,5-dichloro-4-nitrophenyl, -4-nitrophenyl or phthalidyl-5

$R_1'$ signifies hydrogen, methyl or acylamino, $R_2'$ signifies hydrogen, $C_{1-2}$-alkoxy or $C_{1-2}$-alkoxyethoxy, $R_3$ signifies hydrogen, $C_{1-2}$-alkyl, allyl, $C_{1-2}$-alkoxyethyl, $C_{1-2}$-alkoxycarbonyloxyethyl or $C_{1-2}$-alkylcarbonyloxyethyl $R_4'$ signifies hydrogen $R_5$ signifies a radical formula

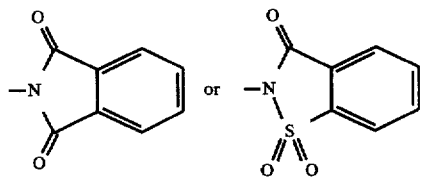

$R_{10}'$ signifies hydrogen m signifies 0 or 1 and n signifies 1 or 2.

6. Process for the production of the dyes of formula I as claimed in claim 1, characterized in that a diazotized amine of formula II $$D-NH_2 \qquad (II)$$

is coupled with a compound of formula III

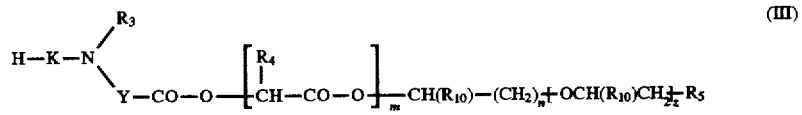

wherein Y, m, n, $R_3$, $R_4$, $R_5$ and $R_{10}$ have the meanings given in claim 1.

7. Process for the production of the dyes of formula Ia as claimed in claim 2, wherein D corresponds to the formula

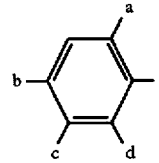

where a and/or d are a cyano radical, wherein the corresponding halogen substituted dyes are subjected to cyano-exchange.

8. A method of dyeing or printing, fibres or threads or materials produced therefrom, said fibres, threads or materials produced therefrom comprising fully or semi-synthetic, hydrophobic, high molecular weight organic materials, said method comprising use of at least one of the dyes as claimed in any one of claims 1 to 5 above.

9. A method of claim 8 wherein the printing comprises transfer printing.

10. Textile which has been dyed or printed with a disperse dye of formula I or mixtures thereof, as claimed in claim 1.

11. Disperse dye of Formula I obtainable by a process according to claim 6.

12. Disperse dye of Formula I obtainable by a process according to claim 7.

* * * * *